Nov. 24, 1964  E. H. SHARP  3,158,108
TIE-DOWN WINCH AND ANCHOR ASSEMBLY
Filed Sept. 25, 1961  3 Sheets-Sheet 1

Nov. 24, 1964     E. H. SHARP     3,158,108
TIE-DOWN WINCH AND ANCHOR ASSEMBLY
Filed Sept. 25, 1961     3 Sheets-Sheet 3

United States Patent Office 3,158,108
Patented Nov. 24, 1964

3,158,108
TIE-DOWN WINCH AND ANCHOR ASSEMBLY
Everett H. Sharp, Lambertville, Mich., assignor to Dana Corporation, Toledo, Ohio, a corporation of Virginia
Filed Sept. 25, 1961, Ser. No. 140,517
3 Claims. (Cl. 105—369)

This invention relates in general to means for securing items on a supporting structure and particularly to a tie-down device for securing items of lading on a transporting structure.

Many prior art devices disclose means for adjustably securing a tie-down device to a transporting structure; however, such devices are insufficient in that they are not properly adjustable so as to give a secure or proper connection with the structure to prevent the relative displacement thereof; or, if a secure connection is provided then such is not readily and easily adjustable.

Therefore, it is an object of this invention to provide a tie-down device which includes means for adjusting the position thereof relative to the transporting structure.

Another object of this invention is to provide such a tie-down device having integral winch means thereon.

Yet another object of this invention is to provide such a device which includes means whereby said device remains secured to the transporting structure even when the tie-down loads applied thereby are relieved.

A further object of this invention is to provide a guide rail and anchor means assembly wherein the anchor means is selectably suported in a locking relationship with the guide rail.

Yet a further object of this invention is to provide such a device wherein the locking relationship between the anchor means and the guide rail is easily obtained or released.

A still further object of this invention is to provide such a device having an anchor means which is slidably received in a guide rail and pivotal relative thereto so as to alternately engage or disengage the same.

In one preferred embodiment of this invention a tie-down assembly is provided for a transporting structure wherein an elongated guide rail means having a plurality of locking means thereon is securedly attached to the structure; and an anchoring means having an integral winch means thereon is slidably and pivotally received in said guide rail means; said anchoring means having means thereon for cooperative registration with said locking means and further being provided with support means for maintaining said registering means in engagement with said locking means to secure said guide rail and said anchor means in a selected locking relationship.

Other objects and features of this invention, together with the advantages thereof, will best be understood by reference to the following specification taken in conjunction with the accompanying drawings, in which.

Figure 1:
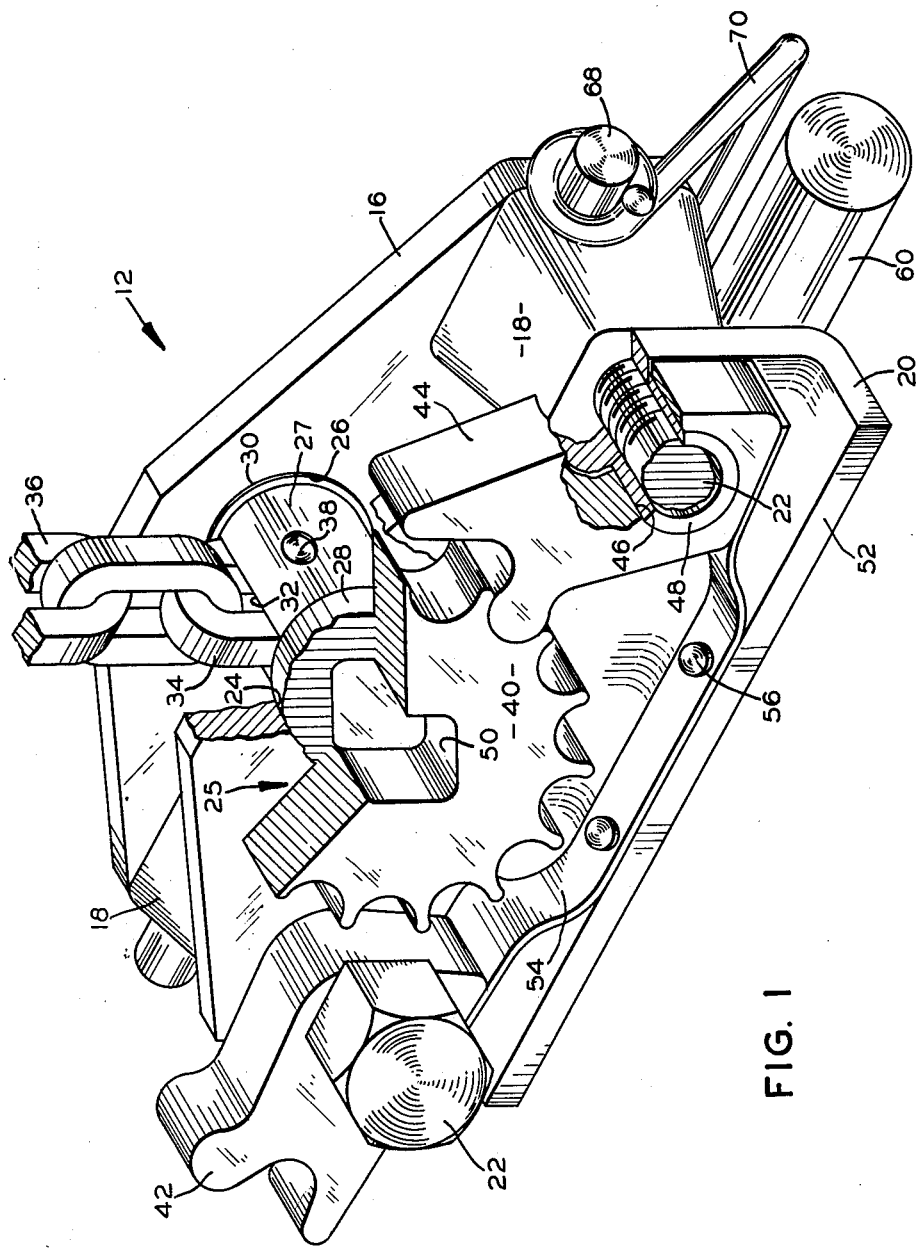
FIG. 1 is an isometric view of the winch and anchor means assembly of a device embodying this invention with portions thereof broken away.

Referring to the drawings, the tie-down device shown generally at 10 comprises an anchoring means 12 and a guide rail means 14. The anchoring means 12 includes a back plate 16 having a pair of spaced aligned bosses 18 extending forwardly therefrom. A front plate 20 is securedly attached to the bosses 18 as by bolts 22 interconnecting the same. The front plate 20 and the back plate 16 are disposed in spaced parallel relationship and have centrally located aligned openings 24 and 26 therein.

A winch means, shown generally at 25, is formed as an integral part of the anchoring means 12. More particularly, a winch arbor 27 is provided with a pair of spaced cylindrical shoulders 28 and 30 slidably received in the openings 24 and 26 respectively of the anchoring means 12 so that the arbor is rotatably mounted therein. The arbor 27 is provided with a radially and axially extending slot 32 between the shoulders 28 and 30, which is adapted to receive the end link 34 of the tie-down securing means or chain shown fragmentarily at 36. A key in the form of pin 38 is pressed through a chordal hole in the arbor 27 normal to the slot 32 and passes within the central opening of the link 34 securedly attaching the same to the arbor 27. It is apparent from the foregoing that rotational movement of the arbor 27, in either direction, will wind the chain 36 thereupon and shorten the effective length thereof. The engagement of the link 34 and the plates 16 and 20 limits the axial movement of the arbor 27 and maintains the same in assembled relationship with the plates 16 and 20.

The winch means 25 includes a ratchet member 40 integrally carried by the arbor 27 on the portion thereof extending beyond the front plate 20 which ratchet member is adapted to cooperate with a pair of opposite acting pawl members 42 and 44 in a well known manner. Each pawl member 42 and 44 is pivotally attached to the anchoring means 12 by the bolt 22. More particularly, each pawl 42, 44 has an opening 46 extending therethrough which rotatably receives an annular spacer member 48 of slightly greater length than the width of the pawl receiving the same. The bolt 22 passes through the annular spacer member 48, then through the front plate 20, and is threadedly received in the boss 18 as previously described. The annular spacer members 48 are provided so that the bolts 22 may be tightly threaded in the boss 18 thereby securely interconnecting the plate 20 to the plate 16 while not fixedly attaching the pawls 42, 44 thereto, but allowing the same to be freely pivotal thereon.

The ratchet member 40 is provided with a central rectangular opening 50 which is adapted to receive a suitable removable wrench (not shown) whereby the winch means 25 may be rotated to wind the chain 36 on to the arbor 27. Two selectable pawls 42, 44 are provided so that the winch means 25 may be rotated in either direction and fixedly positioned as desired whereby the device 10 imposes a load on the item of lading (not shown) to which the chain 36 is suitably attached. When positioned horizontally the pawl, as at 42, is inoperative and does not engage the ratchet 40; when positioned vertically the pawl, as at 44, engages the ratchet 40 and prevents the unwinding thereof. The pawl 44 is used when the arbor 27 has been wound counterclockwise to prevent the unwinding thereof in a clockwise direction, and the pawl 42 is used when the arbor 27 has been wound clockwise to prevent the unwinding thereof in a counterclockwise direction.

The front plate 20 has an integral flange 52 extending forwardly from the lower portion thereof to which a leaf spring 54 is fixedly secured as by a plurality of rivets 56. The lateral ends of the spring 54 are deformed upwardly so as to engage the pawls 42 and 44. The spring 54 by engaging the pawls 42 and 44 biasingly positions the same in either a horizontal or vertical position to prevent the engaged pawl from being inadvertently disengaged from the ratchet means 40 as, for example, by impact or reversing loads and to prevent the disengaged pawl from becoming inadvertently engaged with the ratchet means.

The anchor means 12 includes a pair of laterally spaced registering means in the form of necked-down connecting portions 58 which are integral with the back plate 16 and depend therefrom. The lower extremities of the connecting portions 58 terminate intermediate the ends of an elongated slide bar 60 which is disposed in spaced, aligned, and parallel relationship relative to the back plate 16. The slide bar 60 is preferably of cylindrical shape and extends a distance slightly greater than the full length of the anchor means 12.

Figure 3:
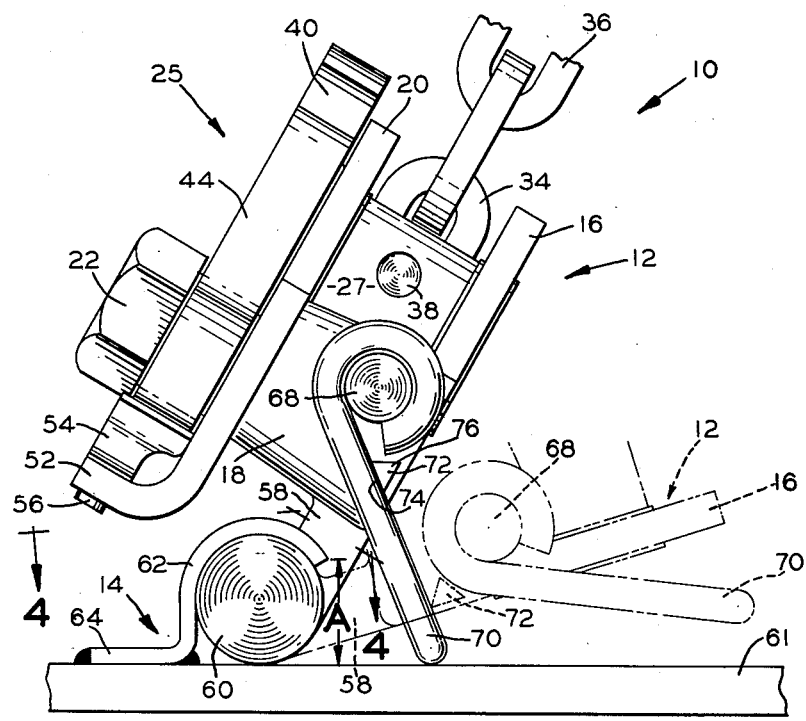
FIG. 3 is an end elevational view of the tie-down device showing the locked position in full and the unlocked position in phantom.
Figure 4:
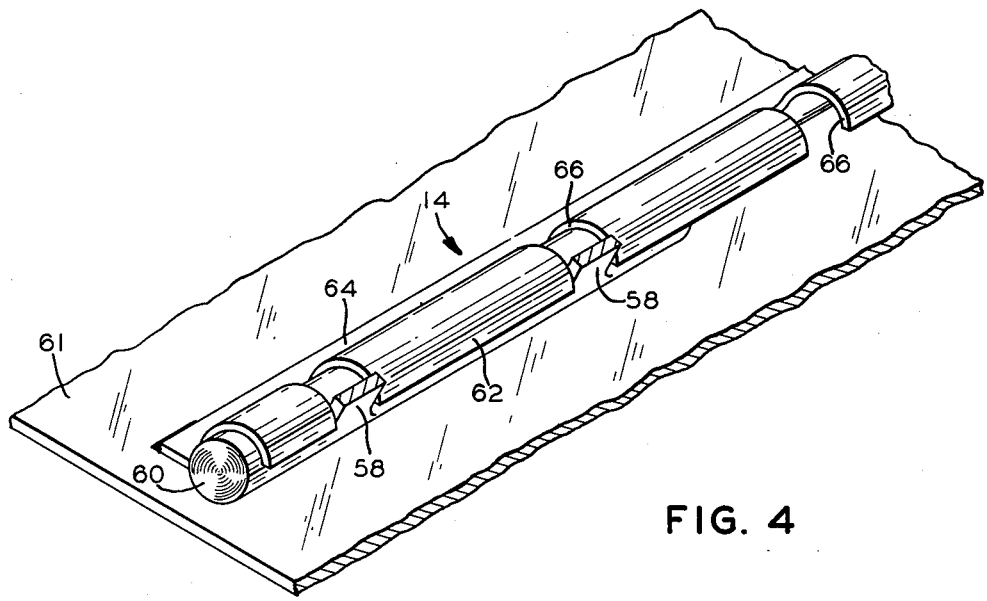
FIG. 4 is an isometric view of a portion of the device taken along the lines 4—4 in FIG. 3.

Referring to FIGS. 3 and 4 wherein a transporting structure is shown fragmentarily at 61, the elongated guide rail 14 has a portion 62 of C-shaped cross-section and a flange portion 64 integral therewith is secured to the transporting structure 61 as by welding.

The guide rail 14 embraces and slidably receives the slide bar 60 for relative longitudinal and pivotal movement. The distance between the lip of guide rail 14 and the structure 61, represented by the arrow A, in FIG. 3 is selected to be smaller than the diameter of the rod 60 so that the latter may not escape therebetween. The C-shaped portion 62 is provided with a plurality of locking or registering means in the form of notches 66, which are of a width slightly greater than the width of the connecting portions 58 and are adapted to register or receive the same.

Means are provided to adjustably position the anchoring means 12 relative to the guide rail means 14 and to securely interengage the same. More particularly, as clearly shown by the full line representation in FIG. 3 and by FIG. 4, when the anchoring means 12 is positioned substantially upright relative to the supporting structure 61 with the connecting portions 58 in registration with the cooperating notches 66, relative longitudinal movement between the slide bar 60 and the guide rail means 14 can not take place. In this position, as long as the chain 36 is subjected to a load component in a direction upwardly from the structure 61, the members 12 and 14 will retain the relative position shown in full in FIG. 3; however, if the load on the chain 36 is disrupted, the anchoring means 12, due to the effect of gravity thereon, will assume the position shown in phantom in FIG. 3. In this "unloaded" position, the connecting portions 58 are free from engagement with the notches 66 and the slide bar 60 may move longitudinally relative to the guide rail 14.

To prevent the anchoring means 12 from assuming the position shown in phantom, the back plate 16 is provided with a pair of aligned bosses 68 extending longitudinally from the ends thereof. The bosses have a U-shaped support means 70 (pivotally mounted thereon). The support means 70 is preferably formed from a resilient material, the ends of which are deformed to embrace the bosses 68 in a relatively movable manner.

Figure 2:
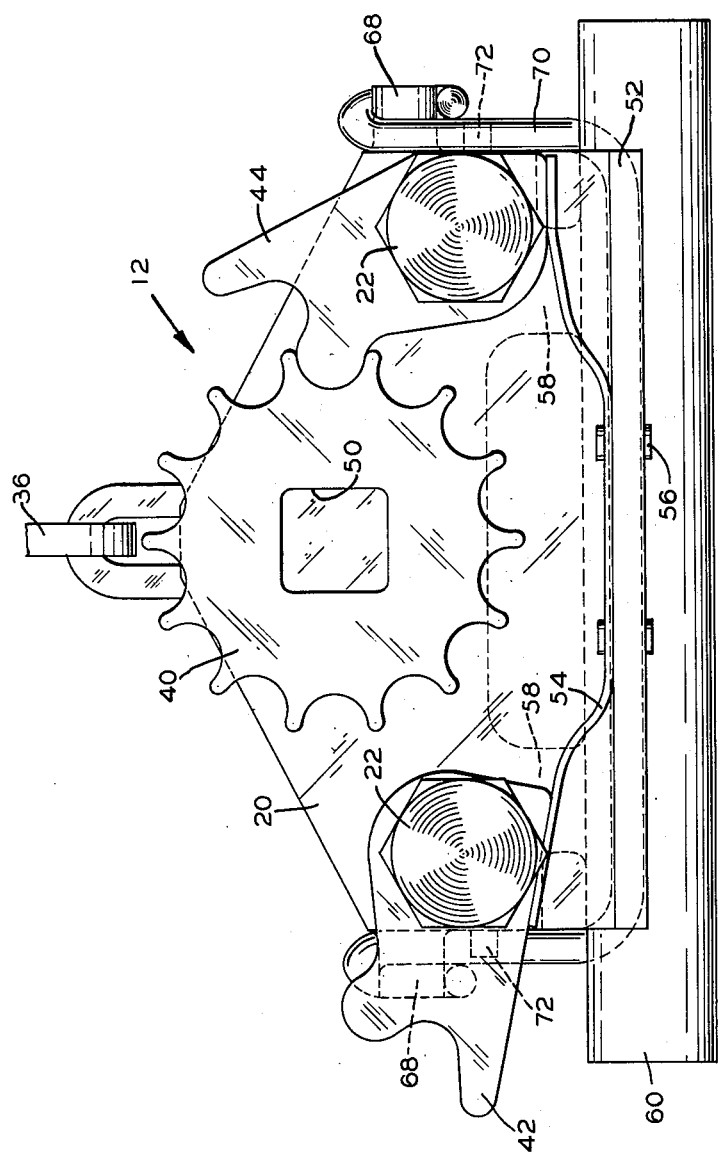
FIG. 2 is a front elevational view of the device shown in FIG. 1.

Abutment means in the form of triangular bosses 72 (FIGS. 2 and 3) are provided on the ends of the back plate 16. The bosses have a shoulder 74 which extends normal to the end of the plate 16 for the full length of bosses 72 and an end cam shoulder 76 which is inclined relative to the plate 16. The bosses 72 are carried by the back plates 16 so that shoulder 74 abuts the support means 70 on the upward side thereof maintaining the same in a position which supports the anchoring means 12 substantially upright. In this manner, the registered connecting portions 58 and notches 66 are securely interengaged; and, even if the chain 36 becomes unloaded, the support means 70 will maintain the interengaged relationship of the anchor means and guide rail.

To disengage the connecting portions 58 from the notches 66, the ends of the support means 70 are manually flexed outwardly away from the ends of the back plate 16 until they no longer abut the shoulder 74 of the abutment means 72. With the parts disposed in this relationship the support means 70 may be pivoted counterclockwise from the position shown in full in FIG. 3, so that the same is no longer operable to maintain the anchoring means 12 in an upright position. At this time, and with the chain 36 unloaded, the slide bar 60 of the anchoring means 12 may be pivoted clockwise relative to the guide rail means 14 so that the connecting portions 58 are no longer in engaging registration with the notches 66. This disengaged position is shown in phantom in FIG. 3, and with the tie-down device 10 so disposed, the anchoring means 12 may be moved longitudinally relative to the guide rail 14 by sliding the slide bar 60 in the C-shaped section 62.

To reposition the device 10 in its locked condition, the connecting portions 58 are aligned with the selected notches 66 and placed in registration therewith by pivoting the anchoring means 12 upwardly. The support means 70 is then manually pivoted downwardly. In so pivoting the support means 70, there is no need to manually flex the ends of the same laterally, for the support means will engage the inclined shoulder 76 of the abutment means 72 and be cammed outwardly thereby until such time as the support means 70 passes below the boss 72. Since the support means 70 is of a resilient nature, it will return to an abutting relationship with the lateral ends of the plate 16 and upward movement thereof will again be prevented by the shoulder 74 of the boss 72. With the device 10 in the selected position, and the end of the chain 36 attached to the item of lading (not shown), the winch means 25 is adjusted to tension the chain 36 as desired and is securely retained by the suitable pawl 42 and 44.

From the foregoing it is apparent that a tie-down device for securing items of lading on a transport structure has been described which includes means for adjusting the position thereof relative to the transporting structure; which has an integral winch means thereon; which device retains a desired position relative to the transporting structure even when the tie-down loads applied thereby are relieved; and which device is supported in an easily obtained or released locking relationship.

The preferred embodiment of this invention has been shown and described, but changes and modifications can be made, and it is understood that the foregoing description is illustrative only and not for the purpose of rendering this invention limited to the details illustrated or described except insofar as they have been limited by the terms of the following claims.

What is claimed is:

1. A device for tying-down an item on a structure comprising in combination an elongated guide rail means secured to said structure, a plurality of longitudinally spaced notch means provided on said guide rail means, anchor means adjustably connected to the said guide rail means and including a plate, securing means operatively connected to said plate and adapted to be connected to the item, a slide bar pivotally received by said guide rail means and being longitudinally adjustable relative thereto, means connecting said slide bar and said plate and engaging said notch means upon pivotal movement of said slide bar in a first direction relative to said guide rail means thereby connecting said anchor means and said guide rail means against relative longitudinal movement and being disengaged from said notch means upon pivotal movement of said slide bar in a second direction relative to said guide rail means whereby said anchor means is longitudinally adjustable relative to said guide rail means to align said connecting means with a selected one of said plurality of notch means, support means operatively connected to said anchor means and in a first position maintaining said slide bar pivoted in said first direction and in a second position permitting said slide bar to pivot in said second direction, and means for maintaining said support means in said first position whereby said anchor means is securely positioned relative to said guide rail means.

2. A device for tying down an item on a structure comprising in combination, (a) securing means adapted to engage the item,
(b) means for adjustably connecting said securing means to said structure including
  (1) a guide rail means having a longitudinally elongated axis and being adapted to be connected to the structure, and
  (2) anchoring means cooperable with said guide rail means and being longitudinally adjustably movable relative thereto and being pivotally movable relative thereto in a direction transverse to the longitudinal axis of said guide rail means,
(c) said guide rail means having a plurality of longitudinally spaced first registering means fixedly positioned thereon,
(d) said anchoring means comprising,
  (1) a single adjusting bar movably received by said guide rail means for longitudinal movement and for transverse pivotal movement relative thereto in a first and an opposite direction and being engageable with said guide rail means whereby relative movement therebetween other than said longitudinal and transverse pivotal is inhibited,
  (2) second registering means connected to and unitarily movable with said adjustable bar and registerable with said first registering means upon pivotal movement of said adjusting bar in said first direction for locking said bar against longitudinal movement relative to said guide rail means and being displaced from registration with said first registering means upon pivotal movement of said adjusting bar in a direction opposite to said first direction,
  (3) winch means carried by said anchor means and attached to said securing means, and
(e) means adjustably and supportingly connected to said anchoring means and adapted to maintain said registering means in registration,
(f) whereby with said registering means in registration and said supporting means maintaining such registration said anchoring means and guide rail means are inhibited from moving longitudinally relative to each other.

3. A device for tying down an item on a structure comprising in combination,
(a) securing means adapted to engage the item,
(b) means adjustably connecting said securing means to the structure comprising
  (1) an elongated guide rail means having a longitudinally elongated axis and a plurality of longitudinally spaced first registering means fixed thereon, and
  (2) anchoring means adjustably carried by said guide rail means,
(c) said anchoring means including
  (1) a slide bar received by said guide rail means and being solely longitudinally movable relative thereto and pivotally movable relative thereto in a direction transverse to said longitudinal axis thereof in a first and a second direction,
  (2) second registering means fixedly carried by said slide bar and unitarily movable therewith and registering with at least one of said first registering means aligned therewith upon pivotal movement of said slide bar in said first direction and being displaced from said first registering means upon pivotal movement of said slide bar in said second direction,
  (3) winch means carried by said anchoring means and attached to said securing means, and
  (4) supporting means connected to said anchoring means and having selectable operative and inoperative positions and being adapted when operatively positioned to maintain said slide bar pivoted in said first direction whereby said anchoring means is secured to said guide rail means and maintained from longitudinal movement relative thereto by the registration of said registering means and when inoperatively positioned to permit said slide bar to pivot in said second direction whereby said registering means are free from registration and said anchoring means is longitudinally adjustable relative to said guide rail means.

References Cited in the file of this patent
UNITED STATES PATENTS

| | | |
|---|---|---|
| 1,934,697 | Butterworth | Nov. 14, 1933 |
| 2,449,600 | Geiger | Sept. 21, 1948 |
| 2,969,023 | Chapman et al. | Jan. 24, 1961 |
| 2,970,552 | Baker | Feb. 7, 1961 |
| 3,038,740 | Blunden | June 12, 1962 |